United States Patent
Iwashita et al.

(10) Patent No.: US 8,410,744 B2
(45) Date of Patent: Apr. 2, 2013

(54) MOTOR DRIVING APPARATUS

(75) Inventors: Yasusuke Iwashita, Minamitsuru-gun (JP); Shinichi Horikoshi, Minamitsuru-gun (JP); Takashi Harada, Minamitsuru-gun (JP); Masakazu Niwa, Minamitsuru-gun (JP); Koujirou Sakai, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/215,563

(22) Filed: Aug. 23, 2011

(65) Prior Publication Data

US 2012/0068637 A1 Mar. 22, 2012

(30) Foreign Application Priority Data

Sep. 16, 2010 (JP) ................. 2010-208260
Jun. 3, 2011 (JP) ................. 2011-125433

(51) Int. Cl.
*H02P 27/04* (2006.01)
(52) U.S. Cl. ........ 318/800; 318/801; 318/803; 318/376; 363/40
(58) Field of Classification Search .................. 318/599, 318/801, 811, 799, 139, 800, 803, 808, 262, 318/268, 375–376; 363/40
See application file for complete search history.

(56) References Cited

U.S. PATENT DOCUMENTS

| 7,135,835 B2 * | 11/2006 | Yamada et al. ........ 318/800 |
| 8,054,012 B2 * | 11/2011 | Matsubara et al. ........ 318/139 |
| 2010/0192788 A1 * | 8/2010 | Tanaka et al. ........ 100/214 |

FOREIGN PATENT DOCUMENTS

| JP | 2000-236679 | 8/2000 |
| JP | 2005-204391 | 7/2005 |
| JP | 2006-230040 | 8/2006 |
| JP | 2010-178584 A | 8/2010 |

* cited by examiner

*Primary Examiner* — Antony M Paul
(74) *Attorney, Agent, or Firm* — Drinker Biddle & Reath LLP

(57) ABSTRACT

During motor acceleration control period that starts at time T1, if power supply output or supply current exceeds a predetermined level at time T2, PWM control in a PWM converter is turned off until a deceleration control period of T3 to T4 ends. As a result, DC link voltage (voltage of a power storage device) at the start of the deceleration control at time T3 drops to provide space for storing regenerative power; since the PWM control in the PWM converter is off during the deceleration control period, the regenerative power can be stored into the power storage device and reused in the next control cycle.

11 Claims, 5 Drawing Sheets

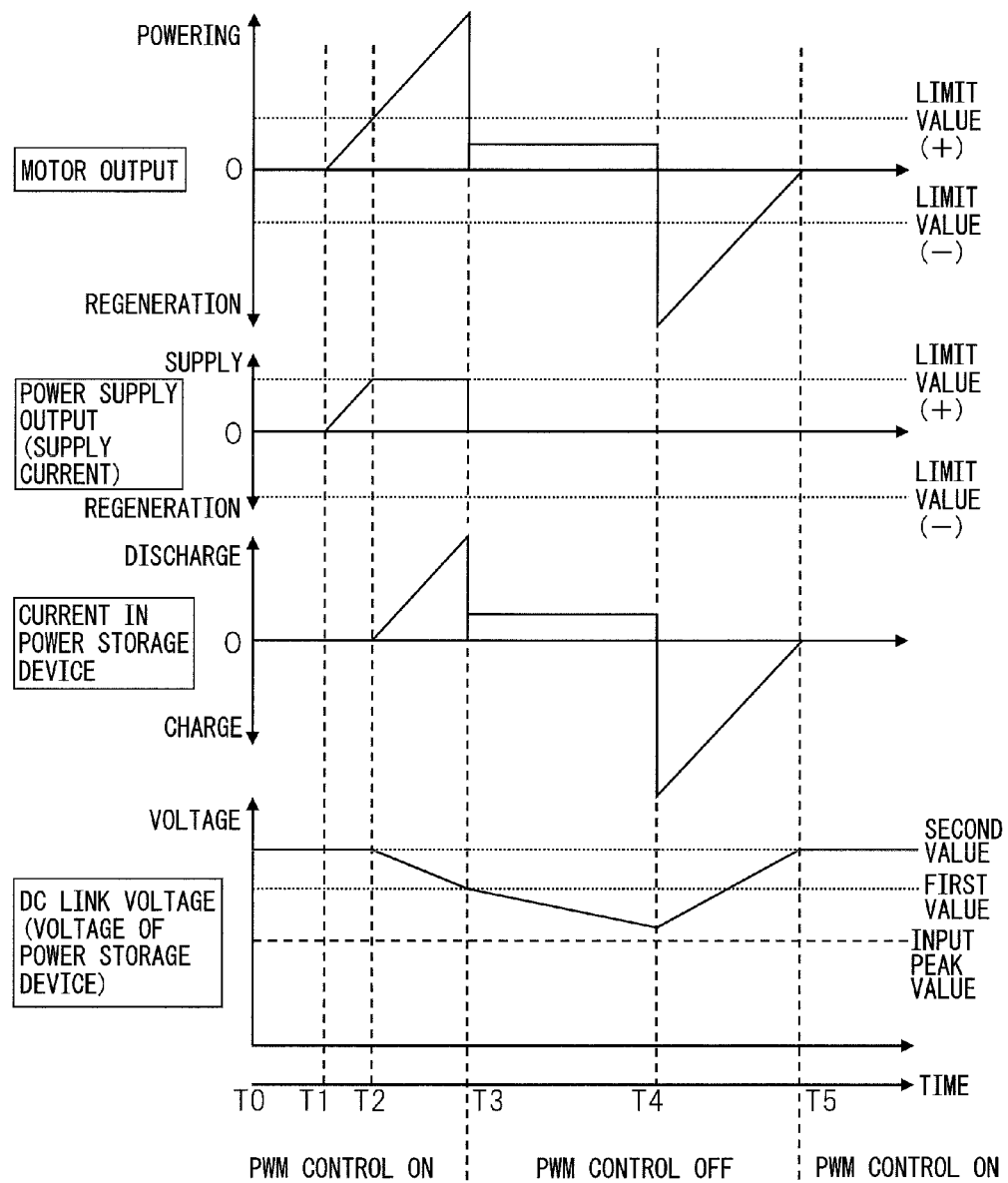

MOTOR DRIVING APPARATUS

RELATED APPLICATION DATA

This application claims priority under 35 U.S.C. §119 and/or §365 to Japanese Application No. 2010-208260 filed Sep. 16, 2010 and Japanese Application No. 2011-125433 filed Jun. 3, 2011, the entire contents of both of which are incorporated herein by reference.

BACKGROUND OF THE INVENTION

1. Field of the Invention

The present invention relates to a motor driving apparatus that uses a power storage device in order to reduce the capacity of a power supply system.

2. Description of the Related Art

In a motor driving apparatus for driving a machine tool, industrial machine, robot, or the like, a PWM converter which can control DC link voltage to a desired voltage higher than the peak value of the input voltage, at near unity power factor through PWM switching operation of power semiconductor devices, is widely used as a converter for converting the input AC power to DC power.

Japanese Unexamined Patent Publication No. 2000-236679 discloses a technique in which a power storage device is connected to the output of a PWM converter and the PWM converter is operated so as to limit the input current, with provisions made to use the power storage device as a buffer to provide motor driving power, thereby suppressing peaks in the power supplied from the power supply during motor acceleration and also suppressing peaks in the regenerative power flowing back to the power supply during motor deceleration.

According to this technique, the power peaks are suppressed by the buffering capability of the power storage device. However, since control is performed so that the voltage of the power storage device is maintained constant at all times, the regenerative power that occurs during motor deceleration is returned to the power supply or, if this is not possible, the regenerative power ends up being consumed by resistors and is not stored in the power storage device for reuse. Accordingly, with this technique, the total amount of power that has to be supplied from the power supply during motor acceleration and constant speed operation does not become smaller than when the power storage device was not used. There is therefore the problem that the above technique does not contribute to significantly easing the requirements on the power supply capacity.

SUMMARY OF THE INVENTION

In a motor driving apparatus using a power storage device, it is an object of the present invention to further ease the requirements on the power supply capacity by reducing not only power peak values but also the total amount of power that has to be supplied from the power supply.

There is provided a motor driving apparatus includes a PWM converter which, under PWM (Pulse Width Modulation) control, converts AC power supplied from a power source into DC power and vice versa, a PWM inverter which converts the DC power output from the PWM converter into variable-frequency AC power and vice versa, and which drives a motor with the variable-frequency AC power, a power storage device, provided between the PWM converter and the PWM inverter, that can store electric power in an amount capable of driving the motor, and a control circuit which turns on and off the PWM control in the PWM converter, and wherein power less than the power required by the motor during an acceleration control period of the motor is supplied from the PWM converter, thereby causing the voltage of the power storage device at the start of a deceleration control period of the motor to decrease and allowing at least a portion of the regenerative power occurring in the motor during the deceleration control period to be recovered by the power storage device whose voltage has decreased.

BRIEF DESCRIPTION OF THE DRAWINGS

These and other features and advantages of the present invention will be better understood by reading the following detailed description, taken together with the drawings wherein:

FIG. 5 is a schematic waveform diagram for explaining a third embodiment of the present invention.

DETAILED DESCRIPTION

Figure 1:
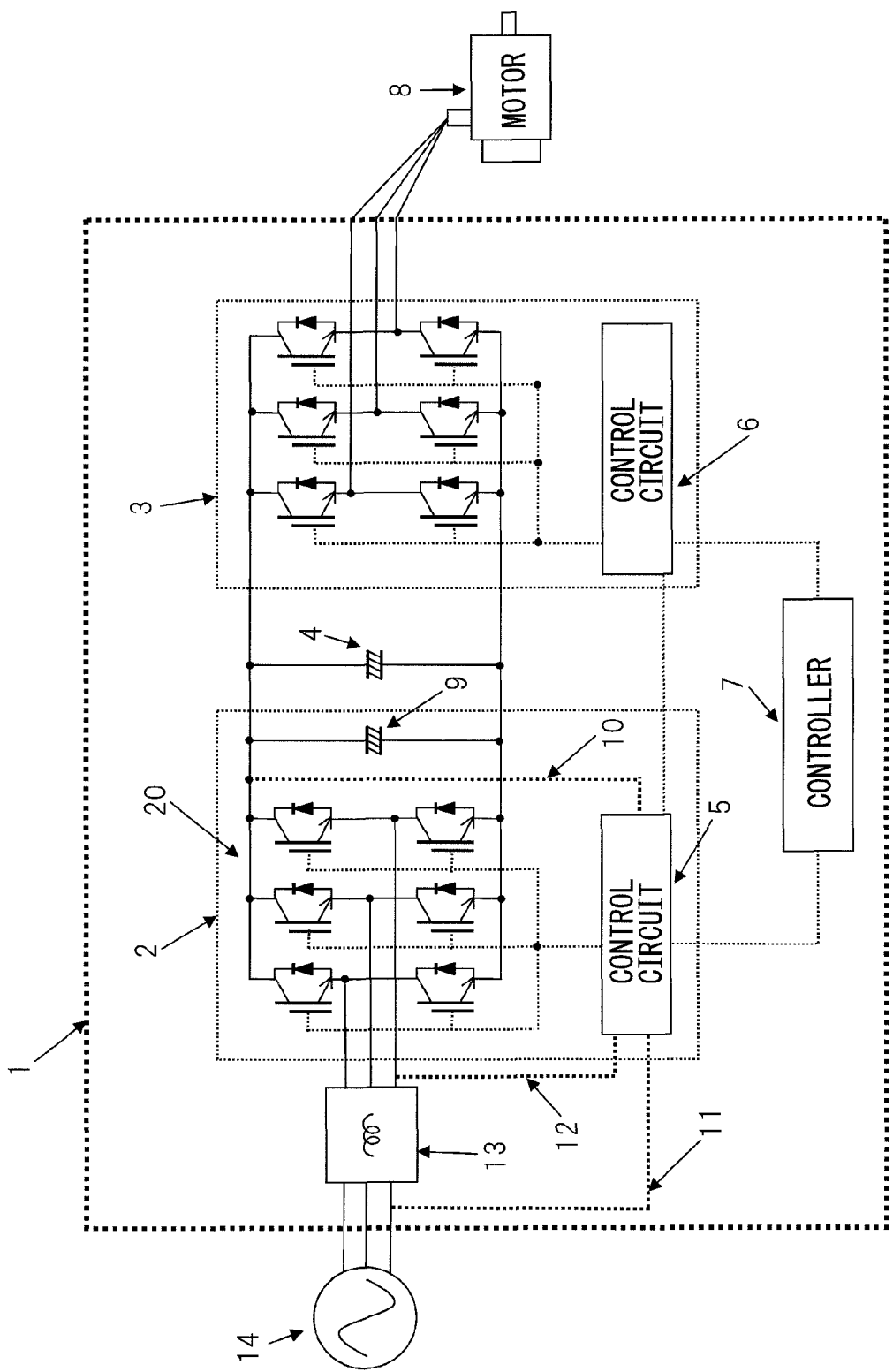
FIG. 1 is a block diagram showing one configuration example of a motor driving apparatus to which the present invention is applied.

FIG. 1 is a block diagram showing one configuration example of a motor driving apparatus 1 to which the present invention is applied. In FIG. 1, the motor driving apparatus 1 comprises: a PWM converter 2 which converts three-phase AC power, supplied from a power source 14 via an AC reactor 13, into DC power and vice versa; a PWM inverter 3 which converts the DC power into variable-frequency three-phase AC power and vice versa, and which drives a motor 8 with the variable-frequency three-phase AC power; and a power storage device 4, provided between the PWM converter 2 and the PWM inverter 3, that can store electric power in an amount capable of driving the motor 8. As the power storage device 4, use may be made, for example, an electrolytic capacitor, an electric double layer capacitor, a large-capacity electric power storage device, etc.

The PWM converter 2 includes: a power device array 20 which converts AC to DC by performing three-phase AC boost switching in cooperation with the AC reactor 13; a smoothing capacitor 9 which smoothes the converted DC power; and a control circuit 5 which controls the switching operation of the power device array 20. The control circuit 5 in the PWM converter 2 controls the switching operation of the power device array 20 by generating a PWM signal based on an error between the detected value of the DC link voltage supplied via a line 10 and its target value and based on the detected value of the input voltage supplied from the power source 14 via a line 11 and the detected value of the input current supplied from the power source 14 via a line 12. In this way, during powering operation, the three-phase AC power from the power source 14 is converted into DC power of a desired voltage higher than the peak value of the input AC voltage and, during regenerative operation, the regenerative power from the motor 8 is converted into DC power by the inverter 3, and the DC power is converted back to three-phase AC power which is passed back to the power source 14. The PWM inverter 3 likewise includes a control circuit 6 for controlling the switching operation of its internal power device array. A controller 7 controls the control circuits 5 and 6 in a consolidated manner.

Figure 2:
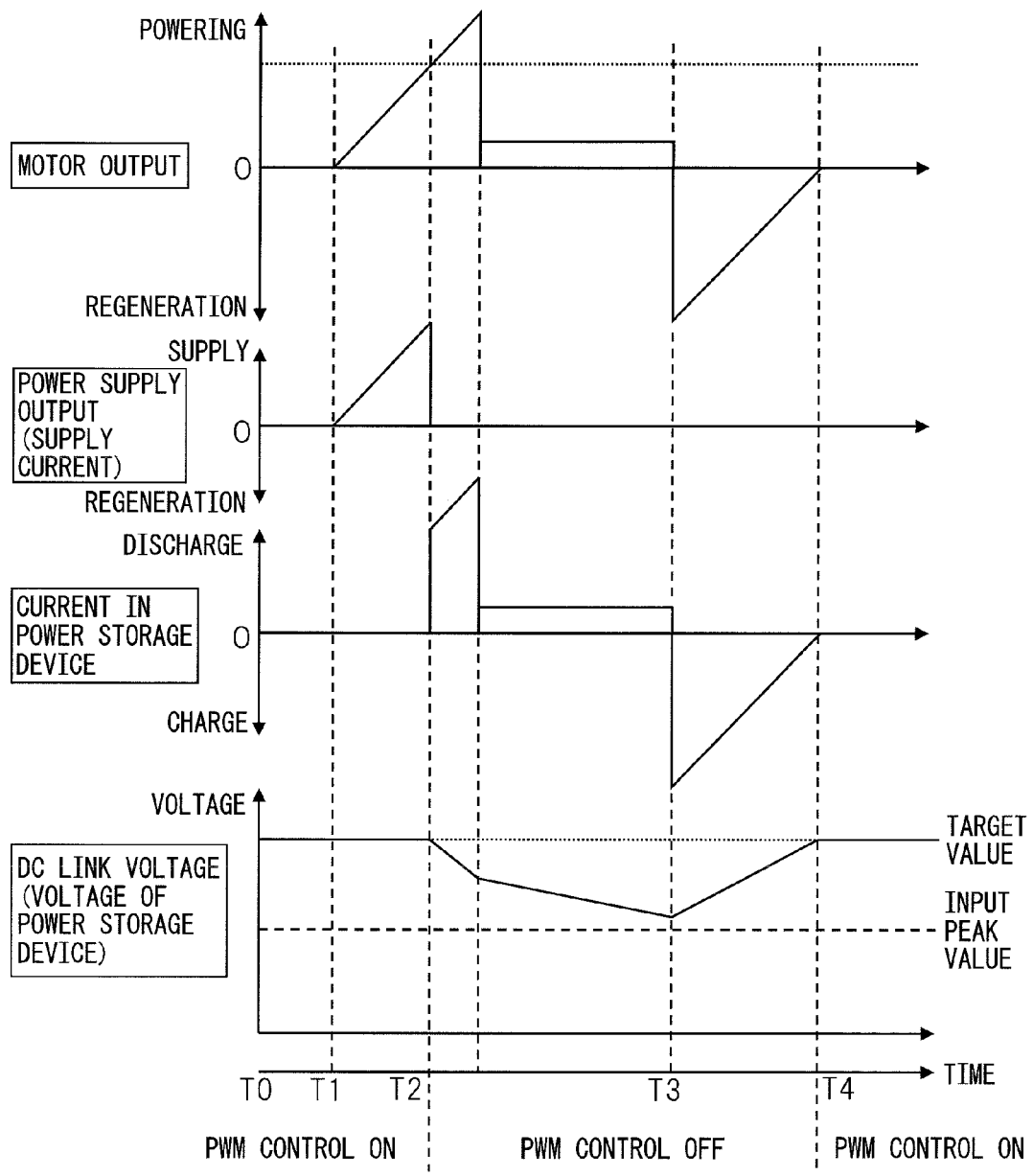
FIG. 2 is a schematic waveform diagram for explaining a first embodiment of the present invention.

FIG. 2 is a schematic waveform diagram for explaining the control of the PWM converter according to a first embodiment of the present invention. In this embodiment, when the power supply output or supply current exceeds a predetermined level during the acceleration control period of the motor 8, the control circuit 5 stops the switching operation of the power devices 20 and turns off the PWM control. The power supply from the power source 14 thus stops, and instead, the power storage device 4 supplies power to drive the motor 8; as a result, the voltage of the power storage device 4 at the start of the deceleration control period drops below the control target value of the DC link voltage (the voltage of the power storage device 4), thus providing space for storing the regenerative power that occurs during the deceleration control period. Then, by keeping the PWM control off during the deceleration control period, the regenerative power is prevented from flowing back to the power supply side but is allowed to be recovered by the power storage device 4, and the regenerative power thus recovered is reused in the next control cycle, thereby reducing the total amount of power that has to be supplied from the power source 14. In this way, the necessary power supply capacity can be reduced.

With reference to FIG. 2, during the period from T0 to T1, the motor 8 is OFF, and the PWM converter 2 controls the DC link voltage (the voltage of the power storage device 4) to a constant voltage higher than the peak value of the input voltage. At time T1, the acceleration of the motor 8 is started under the control of the controller 7. During the period from T1 to T2 (the first half of the acceleration control period), the PWM converter 2 continues to control the DC link voltage (the voltage of the power storage device 4) to a constant voltage higher than the peak voltage of the input voltage, and the power necessary for that purpose is supplied from the power source 14. At time T2, the input current (power) to the PWM converter exceeds the predetermined level, so that the control circuit 5 turns off the PWM control. During the period from T2 to T3 (the second half of the acceleration control period and the constant speed control period), since the PWM control is off, the power supply from the power source 14 is shut off, and power to the PWM inverter 3 is supplied only from the power storage device 4. As a result, the voltage of the power storage device 4 drops. At time T3, the deceleration control is started under the control of the controller 7, and during the period from T3 to T4, the regenerative power is fed into the power storage device 4, and the voltage of the power storage device 4 thus rises. At time T4, the deceleration control ends, whereupon the control circuit 5 switches the PWM control from off to on.

Since the regenerative power occurring during the deceleration control is prevented from flowing back to the power source 14 but is recovered by the power storage device 4 and reused in the next control cycle, the amount of power that has to be supplied from the power source 14 can be reduced.

The control circuit 5 can make a determination as to whether the input current (or the input power) at time T2 has exceeded the predetermined level or not, based on the detected value of the input current from the line 12 (and the detected value of the input voltage from the line 11). Further, the control circuit 5 can determine whether the deceleration control is completed or not, by referring to a signal supplied from the controller 7 or from the control circuit 6 in the inverter 3. Alternatively, for that purpose the control circuit 5 may detect a change in the output of the motor 8.

Figure 3:
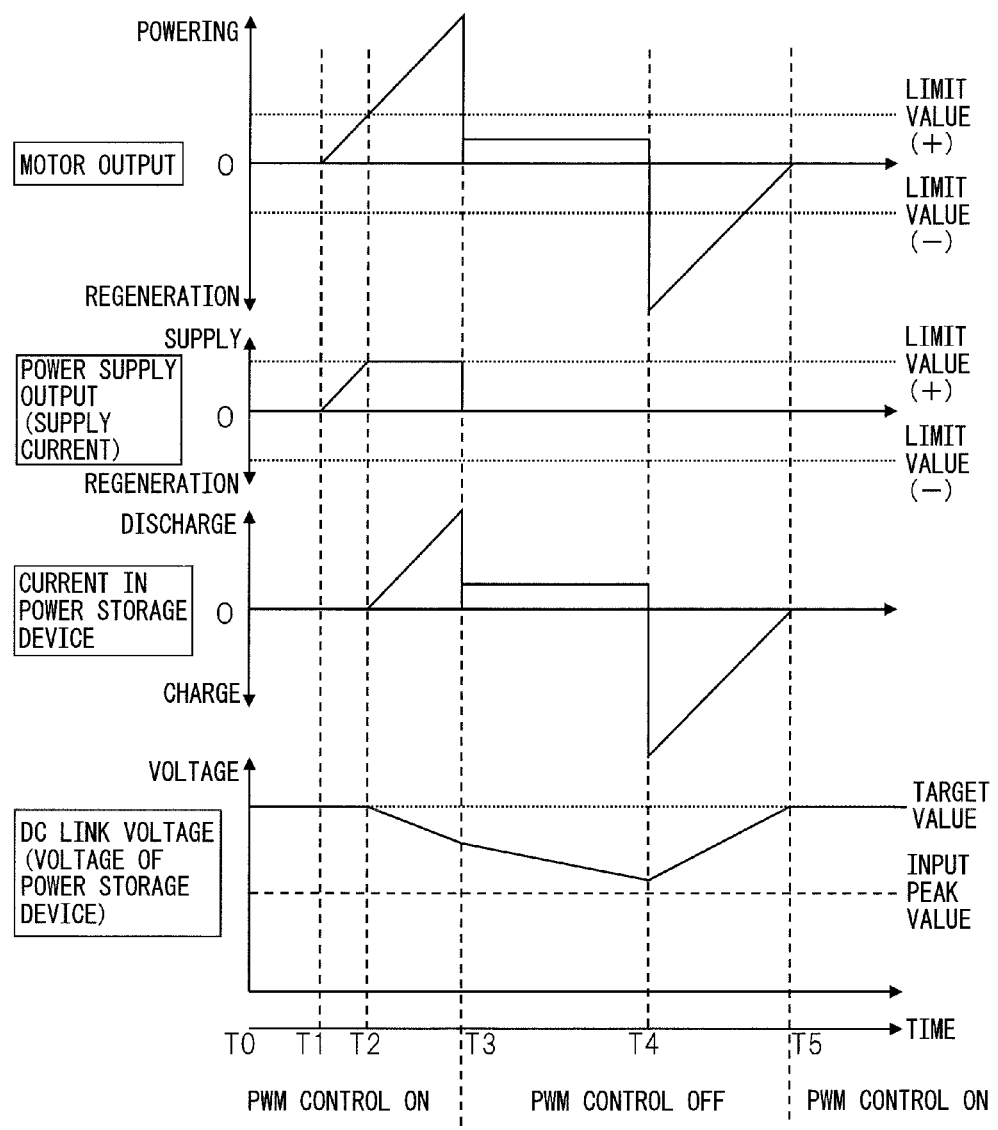
FIG. 3 is a schematic waveform diagram for explaining a second embodiment of the present invention.

FIG. 3 is a schematic waveform diagram for explaining a second embodiment of the present invention. In this embodiment, the power supply output (supply current) is limited to a constant level during the acceleration control period of the motor 8 and, when making a transition to the constant speed control period, the control circuit 5 turns off the PWM control, thereby causing the voltage of the power storage device 4 at the start of the deceleration control period to decrease. The PWM converter 2 of FIG. 1 has a function whereby, when the command value of the input current (power), determined based on the error between the value of the DC link voltage (the voltage of the power storage device 4) detected via the line 10 and its target value, exceeds the limit value of the input current (power), the PWM signal is generated by using this limit value as the command value of the input current (power), thereby limiting the input current (power) within a given range, irrespective of the error between the DC link voltage (the voltage of the power storage device 4) and its target value.

In FIG. 3, during the period from T0 to T1, the motor 8 is OFF, and the PWM converter 2 controls the DC link voltage (the voltage of the power storage device 4) to a constant voltage higher than the peak value of the input voltage. At time T1, the acceleration of the motor 8 is started under the control of the controller 7. During the period from T1 to T2 (the first half of the acceleration control period), the PWM converter 2 continues to control the DC link voltage (the voltage of the power storage device 4) to a constant voltage higher than the peak value of the input voltage, and the power necessary for that purpose is supplied from the power source 14. At time T2, the input current (power) to the PWM converter exceeds the predetermined level, so that the control circuit 5 in the PWM converter 2 performs PWM control so as to limit the input current (power) and maintain the input current at the predetermined level. During the period from T2 to T3 (the second half of the acceleration control period), since the input current is limited, power is supplied from the power storage device 4 to compensate for the deficit. As a result, the voltage of the power storage device 4 drops. At time T3, the motor control makes a transition to the constant speed control, whereupon the control circuit 5 switches the PWM control from on to off. As a result, power to the PWM inverter 3 is supplied only from the power storage device 4, so that the voltage of the power storage device 4 further drops. At time T4, the deceleration control is started under the control of the controller 7, and during the period from T4 to T5, the regenerative power is fed into the power storage device 4, and the voltage of the power storage device 4 thus rises. At time T5, the deceleration control ends under the control of the controller 7, whereupon the control circuit 5 switches the PWM control from off to on.

In this embodiment also, since the regenerative power occurring during the deceleration control is prevented from flowing back to the power source 14 but is recovered by the power storage device 4 and reused in the next control cycle, the amount of power that has to be supplied from the power source 14 to the motor control apparatus 1 can be reduced.

The control circuit 5 can determine whether the transition is made to the constant speed control and whether the deceleration control is completed or not, by referring to a signal supplied from the controller 7 or from the control circuit 6 in the inverter 3. Alternatively, for that purpose the control circuit 5 may detect a change in the output of the motor 8.

In the first and second embodiments, if the voltage of the power storage device 4 is not reduced sufficiently by the time the deceleration control period starts, or if the amount of the regenerative power is larger than expected, the power storage device 4 may go into an overvoltage condition during the deceleration control. To prevent this, provisions should be made so that when the DC link voltage (the voltage of the power storage device 4) rises above a certain level, the control circuit 5 turns on the PWM control and allows a portion of the regenerative power to flow back to the power source 14, even if the deceleration control is not yet completed. Further, the control circuit 5 may perform PWM control so that the regenerative current (power) to flow back to the power source 14 is limited if it has exceeded a predetermined level.

Figure 4:
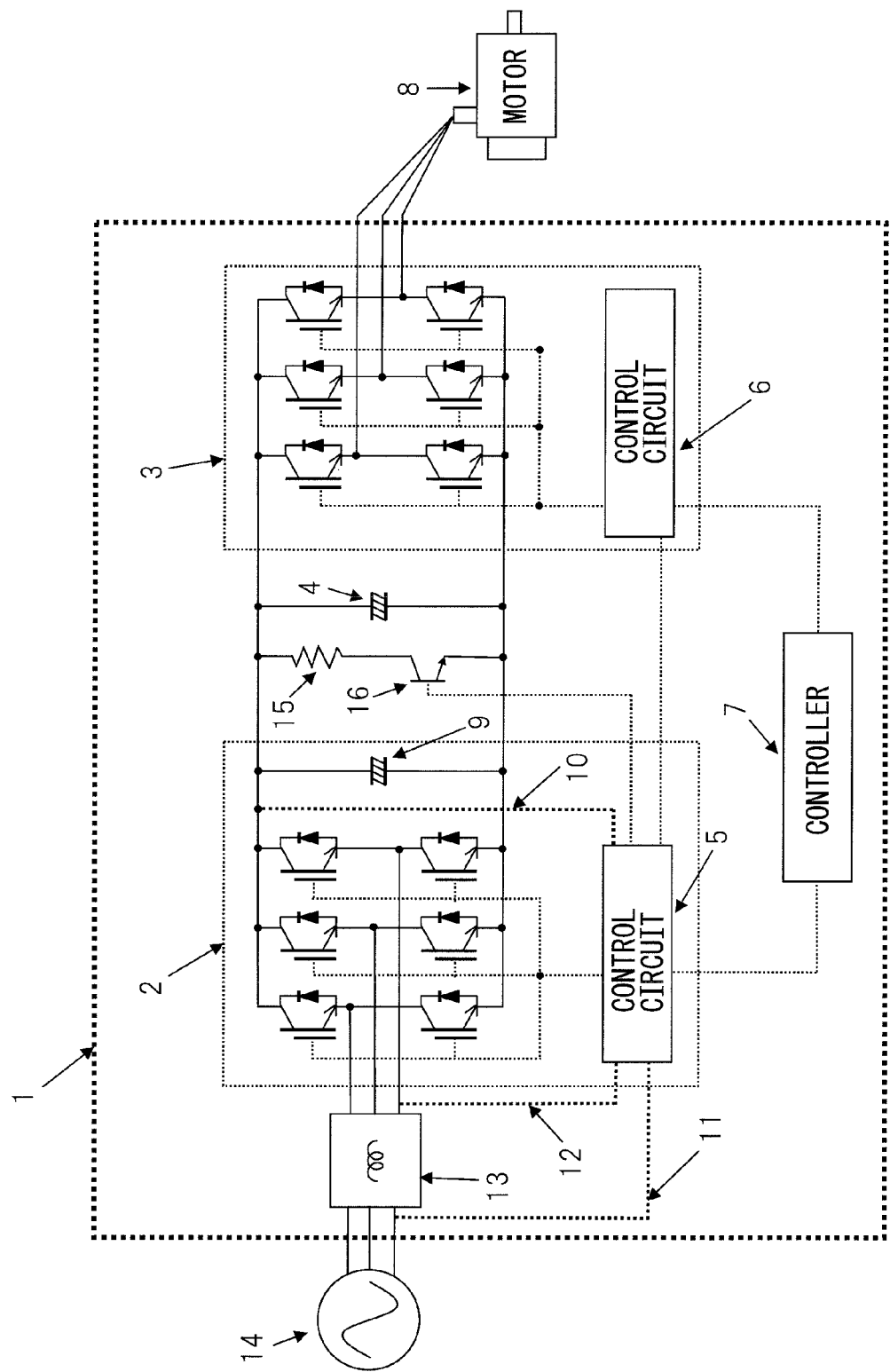
FIG. 4 is a block diagram showing an addition of a resistive discharge unit.

Alternatively, as shown in FIG. 4, a series connection of a resistor 15 and a switch 16 may be provided as a resistive discharge unit in parallel with the power storage device 4, with provisions made so that when the DC link voltage (the voltage of the power storage device 4) exceeds a first threshold, the control circuit 5 performs control to turn on the switch 16 thereby causing the regenerative power to be consumed by the resistor 15 and, when the DC link voltage has decreased to or below a second threshold which is lower than the first threshold, the control circuit 5 performs control to turn off the switch 16 which is turned on again if the DC link voltages thereafter rises above the first threshold, the process being repeated during the deceleration control.

FIG. 5 is a schematic waveform diagram for explaining a third embodiment of the present invention. This embodiment is the same as the second embodiment in that the input current or input power is limited to a predetermined level during the acceleration control, but the difference is that the turning on/off of the PWM control is carried out by the control circuit 5, not by being triggered by the transition of the motor control mode, but based on the result of the comparison made between the DC link voltage (the voltage of the power storage device 4) and a threshold value.

In FIG. 5, during the period from T2 to T3, the DC link voltage (the voltage of the power storage device 4) decreases because the input current or input power is limited and, at time T3 when the DC link voltage decreases to or below a first value, the control circuit 5 turns off the PWM control. During the period from T3 to T4, power to the PWM inverter 3 is supplied only from the power storage device 4. At time T4, the deceleration control is started under the control of the controller 7, the regenerative power is fed into the power storage device 4, and the voltage of the power storage device 4 thus rises. When the DC link voltage (the voltage of the power storage device 4) reaches a second value which is higher than the first value, the control circuit 5 switches the PWM control from off to on. The second value need not necessarily be the same as the control target value of the DC link voltage (the voltage of the power storage device 4). In the example shown in FIG. 5, the on/off timing of the PWM control by the control circuit is the same as the control mode transition timing of the motor 8, but they need not necessarily be the same. Further, the control circuit 5 may turn off the PWM control when the DC link voltage (the voltage of the power storage device 4) changes from decreasing to increasing, rather than when the DC link voltage (the voltage of the power storage device 4) has decreased to or below the first value. Furthermore, the control circuit 5 may turn on the PWM control when the DC link voltage (the voltage of the power storage device 4) changes from increasing to decreasing, rather than when the DC link voltage (the voltage of the power storage device 4) has reached the second value. Alternatively, the control circuit 5 may turn on the PWM control when the DC link voltage (the voltage of the power storage device 4) has decreased to or below the first value, and turn off the PWM control when it has increased to or above the second value.

In the second embodiment, the turning on/off of the PWM control by the control circuit 5 is done by being triggered by the transition of the motor control mode, while in the third embodiment, the turning on/off of the PWM control by the control circuit 5 is done based on the result of the comparison made between the DC link voltage (the voltage of the power storage device 4) and the threshold value; alternatively, the control circuit 5 may turn off the PWM control upon the transition of the control mode and may turn on the PWM control in accordance with the result of the comparison with the threshold value, or conversely, the control circuit 5 may turn off the PWM control in accordance with the result of the comparison with the threshold value and may turn on the PWM control upon the transition of the control mode.

According to the present invention, since the regenerative power occurring in the motor during the deceleration control period is recovered by the power storage device and reused in the next control cycle, there is offered the advantage that the total amount of power that has to be supplied from the power source to the motor control apparatus can be reduced, thus serving to ease the requirements on the power supply capacity.

What is claimed is:

1. A motor driving apparatus comprising:
a PWM converter which, under PWM control, converts AC power supplied from a power source into DC power and vice versa;
a PWM inverter which converts the DC power output from said PWM converter into variable-frequency AC power and vice versa, and which drives a motor with said variable-frequency AC power;
a power storage device, provided between said PWM converter and said PWM inverter, that can store electric power in an amount capable of driving said motor; and
a control circuit which turns on and off said PWM control in said PWM converter, and wherein
the voltage of said power storage device is controlled by said PWM converter to a voltage higher than a supply voltage during the period that said PWM control is turned on by said control circuit, and
power less than the power required by said motor during an acceleration control period is supplied, and at least a portion of a regenerative power occurring in said motor during a deceleration control period is recovered by said power storage device when said control circuit turns off said PWM control from the time a current or power supplied from said power source has exceeded a predetermined limit value during said acceleration control period of said motor until said deceleration control period ends.

2. A motor driving apparatus as claimed in claim 1, wherein said control circuit turns on or off said PWM control in said PWM converter in accordance with a signal supplied from a controller or from an another control circuit provided for said PWM inverter.

3. A motor driving apparatus as claimed in claim 1, wherein during the period that said PWM control is turned on by said control circuit, when a current or power supplied from said power source exceeds a given value, said PWM converter performs control so as to limit the current or power supplied from said power source.

4. A motor driving apparatus as claimed in claim 1, said control circuit switches said PWM control from off to on wherein when the voltage of said power storage device has exceeded a predetermined value during said deceleration control period.

5. A motor driving apparatus as claimed in claim 1, further comprising resistive discharge unit, which resistively discharges a portion of the power stored in said power storage device when the voltage of said power storage device has exceeded a predetermined value during said deceleration control period.

6. A motor driving apparatus comprising:
   a PWM converter which, under PWM control, converts AC power supplied from a power source into DC power and vice versa;
   a PWM inverter which converts the DC power output from said PWM converter into variable-frequency AC power and vice versa, and which drives a motor with said variable-frequency AC power;
   a power storage device, provided between said PWM converter and said PWM inverter, that can store electric power in an amount capable of driving said motor; and
   a control circuit which turns on and off said PWM control in said PWM converter, and wherein
   the voltage of said power storage device is controlled by said PWM converter to a voltage higher than a supply voltage during the period that said PWM control is turned on by said control circuit, and
   a current or power supplied from said power source is limited to a predetermined limit value during an acceleration control period of said motor, and thereafter, said control circuit switches said PWM control from on to off when the control of said motor is switched from acceleration control to constant speed control, and thereby supplying power less than the power required by said motor during said acceleration control period is supplied, and allowing at least a portion of a regenerative power occurring in said motor during a deceleration control period to be recovered by said power storage device when said control circuit turns off said PWM control until said deceleration control period ends, wherein during the period that said PWM control is turned on by said control circuit, when a current or power supplied from said power source exceeds a given value, said PWM converter performs control so as to limit the current or power supplied from said power source.

7. A motor driving apparatus as claimed in claim 6, wherein said control circuit turns on or off said PWM control in said PWM converter in accordance with a signal supplied from a controller or from an another control circuit provided for said PWM inverter.

8. A motor driving apparatus as claimed in claim 6, wherein said control circuit switches said PWM control from on to off when the voltage of said power storage device has decreased to or below the first threshold, or said control circuit switches said PWM control from on to off when the voltage of the power storage device changes from decreasing to increasing.

9. A motor driving apparatus as claimed in claim 8, wherein said control circuit switches said PWM control from off to on when the voltage of said power storage device has increased to or above a second threshold which is higher than said first threshold, the control circuit switches said PWM control from off to on when the voltage of the power storage device changes from increasing to decreasing.

10. A motor driving apparatus as claimed in claim 6, said control circuit switches said PWM control from off to on wherein when the voltage of said power storage device has exceeded a predetermined value during said deceleration control period.

11. A motor driving apparatus as claimed in claim 6, further comprising resistive discharge unit, which resistively discharges a portion of the power stored in said power storage device when the voltage of said power storage device has exceeded a predetermined value during said deceleration control period.

* * * * *